Figure 1:
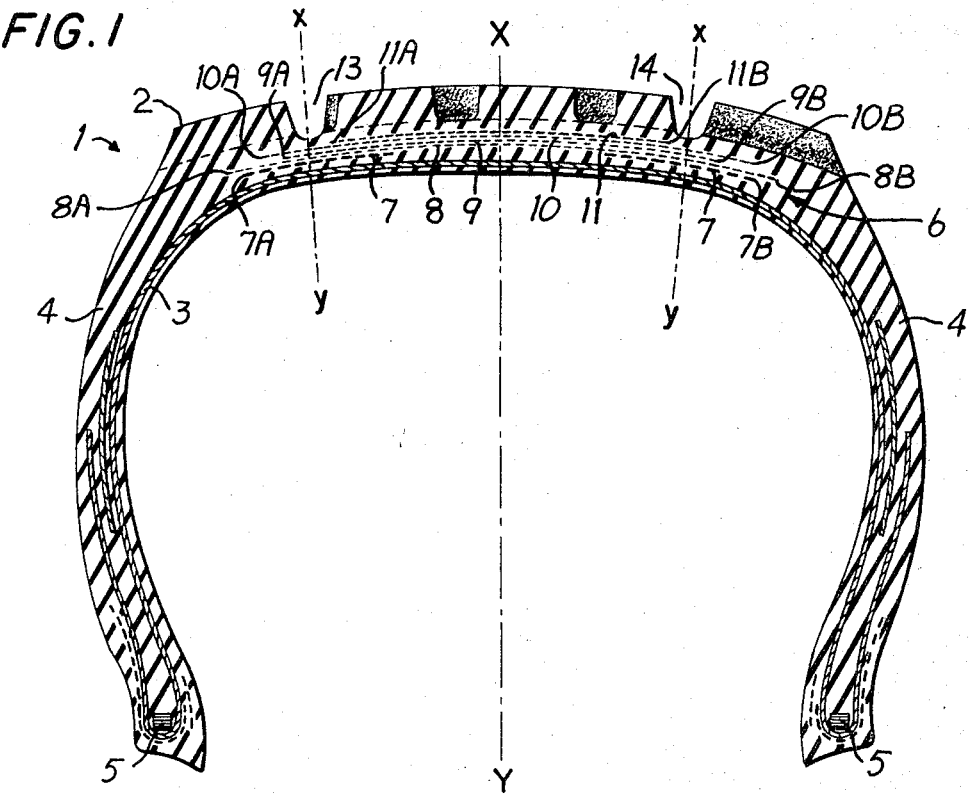

United States Patent [19]
Boileau

[11] 3,841,372
[45] Oct. 15, 1974

[54] PNEUMATIC TIRES
[75] Inventor: Jacques Boileau, Clermont-Ferrand, France
[73] Assignee: Compagnie Generale Des Establissements Michelin, raison sociale Michelin & Cie, Clermonet-Ferrand, France
[22] Filed: May 25, 1972
[21] Appl. No.: 256,947

[30] Foreign Application Priority Data
May 27, 1971 France .............................. 71.19407

[52] U.S. Cl............................................. 152/209 R
[51] Int. Cl. ........................................... B60c 11/08
[58] Field of Search .................... 152/209 R, 109 D

[56] References Cited
UNITED STATES PATENTS
3,000,421  9/1961  Hack et al. ......................... 152/209
3,104,693  9/1963  Bolenbach ......................... 152/209
D177,233   3/1956  Hawkinson .................... 152/209 D Primary Examiner—James B. Marbert
Attorney, Agent, or Firm—Brumbaugh, Graves, Donohue & Raymond

[57] ABSTRACT

A tire with a plurality of crown reinforcing plies in a tiered and staggered array has its internal heat level reduced, its tread adherence on soft ground improved and its tread tear resistance increased by cutting the tread of tire into three zones by means of two circumferential grooves having their center lines between the ends of the two crown reinforcing plies whose edges are nearest the central plane of the tire.

10 Claims, 4 Drawing Figures

PATENTED OCT 15 1974  3,841,372

PNEUMATIC TIRES

The present invention relates to improvements in radial carcass pneumatic tires of very large sizes, intended in particular for construction equipment.

Large radial-carcass tires such as manufactured at the present time have a double reinforcement - a carcass reinforcement and a crown reinforcement. The carcass reinforcement is composed essentially of metal cables arranged in the radial planes of the tire. The crown reinforcement located between the carcass and the tread itself is composed of a number of stacked plies of metal cables arranged at different angles and all extending over a fraction of the width of the tread. For reasons of good distribution of stresses, the ends of these plies are located at different distances from the central plane of the tire; in this connection these plies are distributed into two groups, one comprising the plies of even row and the other the plies of odd row, and in each group the ends of plies are tiered, that is to say, are further from the central plane the nearer the ply is to the carcass. Rather large differences can be observed in the widths of the successive plies. For example, the widest ply and the narrowest ply may extend over widths of close to 85 and 55 percent respectively of the width of the tread.

This tiered and staggered arrangement by groups of plies makes it possible to reduce the concentrations of stresses in the rubber adjacent the ply ends and reduce the internal heating of the tread. However, it still happens that the ply ends nearest the central plane are the seat of undesirable localized heating, which may, in the long run, reduce the life of the tire.

The present invention is directed at further reducing the heat level reached in continuous operation during prolonged rotation of a tire of the type indicated. It is directed at obtaining this result by a new means consisting not only in suitable tiering of the ply ends of the crown reinforcement but in imparting to the tread itself a favorable sculpturing which makes it possible to reduce the localized stresses at the ply ends closest the central plane and, by decreasing the surrounding masses of rubber, to reduce the heat level. The invention is furthermore directed at improving the traction properties of the tread and the ability of its individual elements to withstand being torn off under the effect of the driving couple.

The pneumatic tire in accordance with the invention, which comprises a radial carcass and a crown reinforcement formed of a plurality of stacked plies belonging alternately to two groups, the plies of one and the same group having their ends tiered, is characterized by the fact that the tread is cut into three zones (a central zone and two side zones) by means of two circumferential grooves located in such a manner that their center line is between the ends, located on one and the same side of the central plane of the tire, of the two crown plies whose edges are nearest to said central plane.

This leads in practice to imparting to the side zones a width of the order of 15 to 20% of the width of the tread. The central zone extends over a width of about 50 to 60% of the width of the tread. The two circumferential grooves moreover occupy 10 to 20% of the width of the tread and substantially cover the spaces between ends of the two plies with edges nearest to the central plane.

In accordance with a first series of preferred embodiments, the two side zones of the tread are cut into blocks of approximately rectangular shape by radial or transverse grooves connecting the edges of the tread to the circumferential grooves. The blocks thus formed have a massive form, their dimensions in transverse and in circumferential direction being approximately the same, differeing, for instance, by at most 20 percent. The radial or transverse grooves are relatively wide, having a width between one-quarter and one-half of the circumferential dimension of the rectangular blocks. The area of the blocks is relatively small and one block and one radial groove taken together correspond to a circular sector of 6° to 12° of the circumference of the tread.

In accordance with a second series of preferred embodiments, the central zone of the tread is cut up by oblique grooves extending into one or both circumferential grooves and forming between each other oblique elongated blocks. The inclination of these grooves and of these blocks to the circumferential direction is between 30° and 60°, and preferably close to 45°. The circumferential dimensions of the oblique blocks and grooves are substantially equal to the circumferential dimensions of the blocks and grooves present in the side zones, their dimensions in a direction perpendicular to their orientation being therefore substantially less. The oblique blocks and grooves are present in the same number as there are radial blocks and grooves in each side zone and are staggered half a spacing in the circumferential direction.

As can be seen, the invention involves and preferably combines three main ideas:

a. To relieve the most exposed zones of the crown reinforcement by means of circumferential grooves which are superimposed on the zones. The circumferential grooves which are in the proximity of the crown ply ends closest to the central plane reduce the deformation imposed on said zone of the crown reinforcement which is subjected to relatively high stresses. The result is a substantial decrease in the local heating of these zones and therefore a decreased heat level throughout the tread.

b. To increase the mobility and the breaking up in the circumferential direction of the side zones by radial or transverse grooves which leave blocks of relatively small area but massive shape. This articulation of the side zones avoids upon rotation deformation of continuous, very thick masses of rubber which are therefore subject to the production of substantial heat and ineffective cooling.

c. To increase both the coherence and flexibility of the central zone by oblique cuts forming blocks of relatively large area but of elongated shape, partially overlapping in the circumferential direction. The central zone, which is only slightly articulated although broadly cut, thus acquires both compactness in the contact ellipse which is favorable to adherence and to resistance to tearing off and flexibility which permits good rotation of the tread on the ground.

Experience shows that the above arrangements make it possible to gain simultaneously in heat level of the tire under the same conditions of rotation, in adherence on soft ground and in resistance of the rubber blocks to being torn off.

Figure 2:
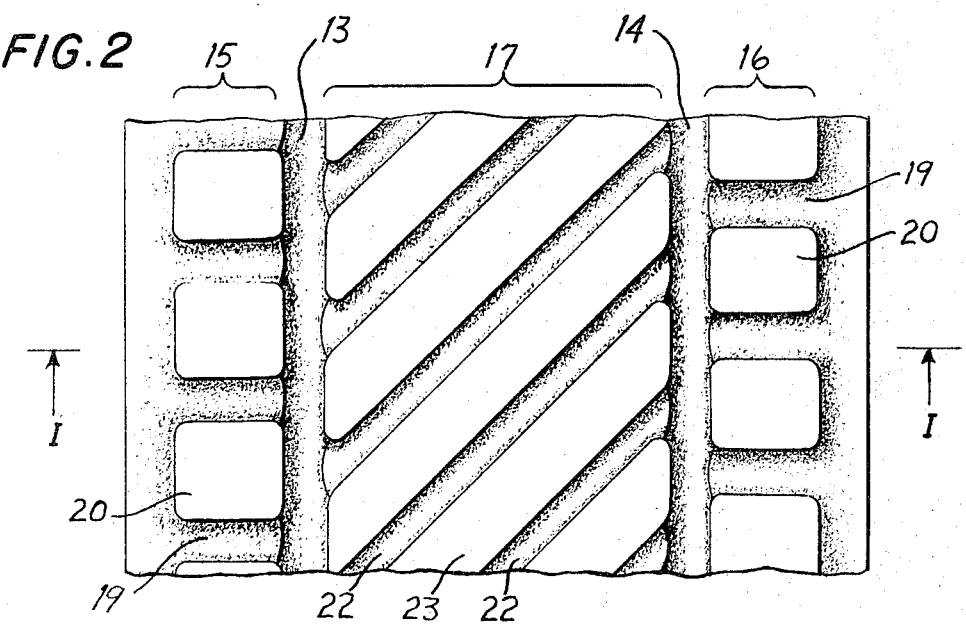
Figure 3:
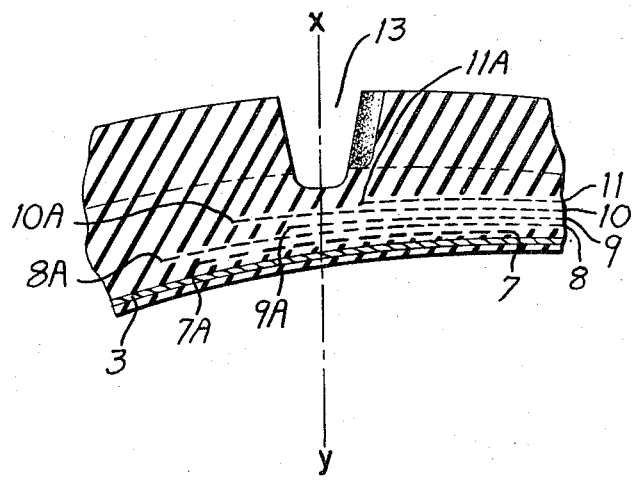
Figure 4:
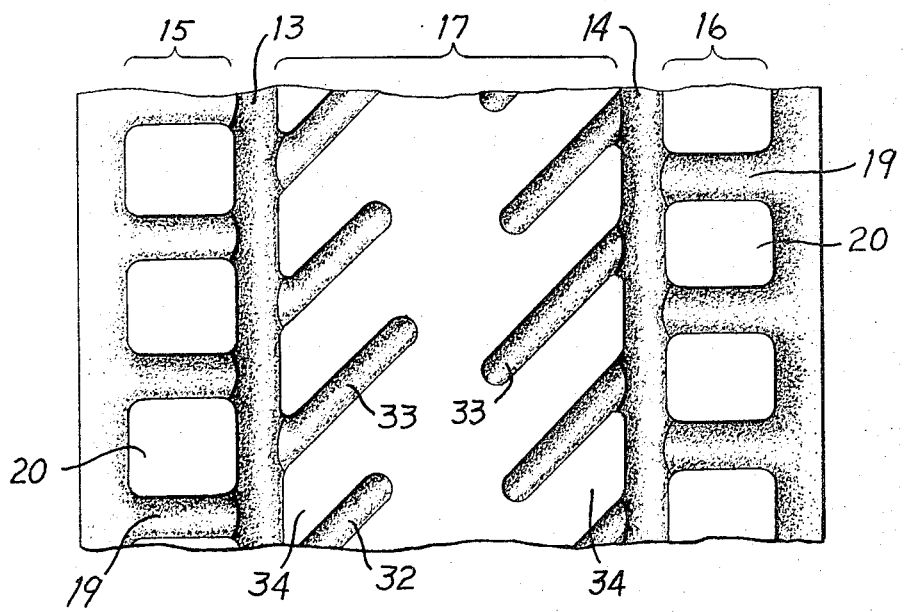

The description of the invention is supplemented by an embodiment which is illustrated in the accompanying drawings. In this embodiment:

FIG. 1 is a radial or transverse section through a pneumatic tire in accordance with the invention, FIG. 2 is a plan view through a sector of about 25° of the tread of the same tire, FIG. 3 is an enlarged view of a part of FIG. 1 in the area of center line $x\ y$ of groove 13, and FIG. 4 is a plan view similar to FIG. 2 of a variant of the invention.

In FIG. 1 there is shown a pneumatic tire 1, the essential parts of which are the tread 2; the carcass ply 3 of radial cords extending below the tread 2 and in the sidewalls 4 and the ends of which are anchored around bead wires 5; and the crown reinforcement 6 consisting of five plies of cords, namely:

the ply 7 formed of two identical elements, one in each of the halves of the tire, the cords of which are inclined by an angle of 70° towards the right, the ply 8 of metal cords inclined 26° towards the right, the ply 9 of metal cords inclined 26° towards the left, the ply 10 of elastic metal cords inclined 26° towards the right, the ply 11 of elastic metal cords inclined 26° towards the left.

As can be noted, these plies are distributed in two groups, namely that of the plies 7, 9 and 11, and that of the plies 8 and 10. The ends of 7A and 7B, 9A and 9B, 11A and 11B of the first three plies are tiered and further away from the central plane XY the closer the ply is to the carcass ply 3. The ends 8A and 8B, and 10A and 10B of the two other plies are also tiered. Moreover, the plies 8 and 10 have their ends (8A, 8B and 10A, 10B) further from the central plane than the ends (9A, 9B and 11A, 11B) of the plies 9 and 11 (see FIG. 3).

In accordance with the invention, the tread 2 is divided by two circumferential grooves 13 and 14 into three zones, namely, the side zones 15 and 16 and the central zone 17, the widths of which are 17 and 53 percent respectively of the width of the tread (see FIG. 2).

The circumferential grooves 13 and 14 are arranged approximately at the same distances from the ends 9A and 11A and 9B and 11B respectively of the plies 9 and 11, the ends of which are nearest to the central plane; the center lines $x\ y$ of the grooves 13 and 14 are, as a matter of fact, substantially at the same distance from the ends 9A, 11A and 9B, 11B, as shown in FIGS. 1 and 3 of the drawing.

The side zones 15 and 16 are furthermore divided by radial or transverse grooves 19 into rectangular blocks 20 of approximately square shape. The radial grooves 19 have a width identical to that of the circumferential grooves 13 and 14, which is equal to 45 percent of the width of the blocks 20.

The central zone 17 of the tread is divided up by oblique grooves 22, at an angle of 45°, which define blocks 23, which are also oblique and inclined at an angle of 45°. The blocks 23 have an area which is approximately 3 times that of the blocks 20 but their maximum and minimum dimensions are in a ratio of 7:1, while in the case of the blocks 20 this ratio is about 1.1:1. Furthermore, the minimum distance between adjacent blocks 23 is substantially less than between adjacent blocks 20, although the dimensions in the circumferential direction of the blocks 23 and of the grooves 22 are the same as those in the blocks 20 and of the grooves 19. This imparts to the central zone 17 of the tread more compactness due to better coherence of the blocks 23. On the other hand, the side zones 15 and 16 are strongly articulated. Furthermore, this meshing-tooth structure could be reinforced by means of additional radial cuts of greater or lesser depth.

The complete tire has 48 blocks in each zone 15, 16 and 17. A block 20 and a groove 19 together thus correspond to a circular sector of 7½°. The blocks 20 succeed each other without overlap in the circumferential direction in the side zones 15 and 16. The blocks 23 succeed each other with extensive overlap in the central zone 17; a block 23 and a groove 22 together extend over a circular sector of about 26°, namely, about 3½ times the circular sector corresponding to a block 20 and its groove 19.

The variant embodiment shown in FIG. 4 differs from that shown in FIGS. 1 to 3 by the fact that the central zone 17 is no longer divided by continuous oblique grooves connecting the two circumferential grooves 13 and 14 but by alternately short and long grooves 32 and 33 inclined 45° with respect to the circumferential direction and terminating in a single circumferential groove 13 or 14. These oblique grooves 32 and 33 define between each other blocks of elongated shape 34. In this variant the part of the central zone 17 included between the blind ends of the grooves 32 and 33 therefore forms a strong uninterrupted circumferential central rib.

In a third variant, not shown in the drawing and based on the variant shown in FIG. 4, the grooves 32 and 33 terminating in the circumferential groove 13 are inclined in direction opposite to the grooves 32 and 33 terminating in the circumferential groove 14, so that the central zone 17 is divided by grooves 32 and 33 into herringbone shape.

It goes without saying that the accompanying drawings have been given merely for purposes of illustration of the invention and that it would be possible to make changes therein without going beyond the scope of the invention. For example, the different grooves could be given an undulated or curved path, although a linear path is preferable. One could diverge somewhat from the preferred dimensions and arrangements indicated. The main ideas or preferred features of the invention are to reduce the thickness of the tread at the crown ply ends having their edges nearest to the central plane, to provide a strongly articulated structure in the side zones of the tread, and to employ a relatively compact and flexible structure in the central zone.

What is claimed is:

1. A tire comprising a radial carcass and a crown reinforcement formed of a plurality of stacked plies belonging alternately to two groups, the plies of one and the same group having their ends tiered, characterized by the fact that the tread is cut into three zones composed of a central zone and two side zones by means of two circumferential grooves located in such a manner that their center line is between the ends, located on one and the same side of the central plane of the tire, of the two crown plies whose edges are nearest to said central plane.

2. The tire defined by claim 1 wherein the two circumferential grooves cover substantially the spaces between the ends, located on one and the same side of the central plane, of the two plies with edges nearest to the central plane.

3. The tire defined by claim 2 wherein the side zones of the tread, of widths of between about 15 percent and 20 percent of the width of the tread, are divided up by radial grooves into blocks of rectangular shape.

4. The tire defined by claim 3 wherein the dimensions of the rectangular blocks in the transverse direction and in the circumferential direction differ by at most 20 percent.

5. The tire defined by claim 3 wherein the width of the radial grooves is between one-quarter and one-half of the dimension of the blocks in the circumferential direction.

6. The tire defined by claim 3 wherein the central zone of the tread, of a width of about 50 percent to 60 percent of the width of the tread, is divided by oblique grooves terminating in at least one of the circumferential grooves and forming elongated oblique blocks between them.

7. The tire defined by claim 6 wherein the inclination of the oblique grooves with respect to the circumferential direction is between 30° and 60° and preferably close to 45°.

8. The tire defined by claim 6 wherein the circumferential dimensions of the oblique blocks and grooves of the central zone of the tread are substantially equal to the circumferential dimensions of the radial blocks and grooves of the side zones of the tread.

9. The tire defined by claim 8 wherein the blocks and grooves of the side zones are staggered by half a spacing in the circumferential direction with respect to the blocks and grooves of the central zone.

10. The tire defined by claim 9 wherein the circumferential spacing between homologous points of adjacent blocks in circumferential direction corresponds to a circular sector of 6° to 12° of the circumference of the tread.

* * * * *